US012636933B2

(12) United States Patent
Mayer et al.

(10) Patent No.: US 12,636,933 B2
(45) Date of Patent: May 26, 2026

(54) HEATING, VENTILATION, AIR-CONDITIONING (HVAC) UNIT FOR A VEHICLE

(71) Applicant: VALEO SYSTEMES THERMIQUES, La Verriere (FR)

(72) Inventors: Tim Mayer, Auburn Hills, MI (US); Cody Barnebee, Auburn Hills, MI (US); Steven Marshall, Auburn Hills, MI (US); Richard Sikorski, Auburn Hills, MI (US); Jason Kreucher, Auburn Hills, MI (US)

(73) Assignee: Valeo Systemes Thermiques, Cergy Pontoise (FR)

( * ) Notice: Subject to any disclaimer, the term of this patent is extended or adjusted under 35 U.S.C. 154(b) by 361 days.

(21) Appl. No.: 18/459,877

(22) Filed: Sep. 1, 2023

(65) Prior Publication Data

US 2025/0074143 A1     Mar. 6, 2025

(51) Int. Cl.
*B60H 1/00*            (2006.01)
(52) U.S. Cl.
CPC ................................ *B60H 1/00671* (2013.01)
(58) Field of Classification Search
CPC .................................................. B60H 1/00671
USPC ......................................................... 454/143
See application file for complete search history.

(56) References Cited

U.S. PATENT DOCUMENTS

| | | | |
|---|---|---|---|
| 9,676,245 B2 | 6/2017 | Clemence et al. | |
| 9,956,846 B2 * | 5/2018 | Bailey ................ | B60H 1/00564 |
| 11,364,768 B2 * | 6/2022 | Barbier ............. | B60H 1/00849 |
| 11,541,717 B2 * | 1/2023 | Barbier ............. | B60H 1/00685 |
| 2016/0144688 A1 * | 5/2016 | Kim ................... | B60H 1/00028 |
| | | | 454/143 |
| 2023/0347715 A1 * | 11/2023 | Wolfe ................. | B60H 1/0005 |
| 2024/0336110 A1 * | 10/2024 | Stabile .............. | B60H 1/00692 |

* cited by examiner

*Primary Examiner* — Steven B Mcallister
*Assistant Examiner* — Dana K Tighe
(74) *Attorney, Agent, or Firm* — Valeo Systemes Thermiques

(57) ABSTRACT

An HVAC unit including: a first aperture, a second aperture and a third aperture, the first aperture and the second aperture being arranged to receive an exterior airflow, and the third aperture being arranged to receive an interior airflow; a first door; a second door, separate from the first door; and a third door; wherein the HVAC unit defines a fresh air mode when the first door is in the open position, the second door is in the open position, and the third door is in the closed position; a partial-recirculation air mode when the first door is in the open position, the second door is in the closed position, and the third door is in the partially-open position; and a recirculation air mode when the first door is in the closed position, the second door is in the closed position, and the third door is in the open position.

20 Claims, 6 Drawing Sheets

HEATING, VENTILATION, AIR-CONDITIONING (HVAC) UNIT FOR A VEHICLE

TECHNICAL FIELD

The present disclosure relates to a Heating Ventilation and Air Conditioning (HVAC) unit for a vehicle. More particularly, the present disclosure relates to a door structure for a partial-recirculation air mode in the HVAC unit.

BACKGROUND OF THE INVENTION

Vehicles are known to incorporate HVAC units to improve the comfort of the people within the passenger compartment of the vehicle. The HVAC units heat and cool air blown through the HVAC unit using a heating heat exchanger and/or a cooling heat exchanger. A blower device is commonly used to ensure movement of the air within the HVAC unit. The heating heat exchanger typically utilizes the engine coolant as a source of heat for heating the air. The cooling heat exchanger is typically an evaporator, which is part of an air conditioning unit in the vehicle powered by the engine of the vehicle. The air blown through the HVAC unit comes from air outside the vehicle, air inside the passenger compartment of the vehicle or a combination of the air outside the vehicle and the air inside the passenger compartment of the vehicle. The air being blown through the HVAC unit is conditioned (heated/cooled) and is then directed into the passenger compartment of the vehicle through one or more outlet vents.

In some configurations, in particular when the HVAC unit is in a partial recirculation mode, where the air from inside of the passenger compartment is mixed with air coming from outside of the vehicle, and with blower operating at a lower speed, the extra RAM air coming into a fresh air opening when the vehicle is driving down the road can bypass the blower and directly enter the passenger compartment. The air bypassing the blower and coming out into the cabin is un-conditioned and can bring excess moisture, hot air, or cold air into the cabin. It would be desirable to avoid such incidental occurrence.

SUMMARY OF THE INVENTION

The object of the invention is a heating, ventilation and air conditioning unit comprising: a case defining a first aperture, a second aperture and a third aperture, the first aperture and the second aperture being arranged to receive an exterior airflow, and the third aperture being arranged to receive an interior airflow; a first door rotatably attached to the case, the first door being movable between an open position where the first aperture is open and a closed position where the first aperture is closed; a second door, separate from the first door, rotatably attached to the case, the second door being movable between an open position where the second aperture is open and a closed position where the second aperture is closed; and a third door rotatably attached to the case, the third door being movable between an open position where the third aperture is open, a closed position where the third aperture is closed, and a partially-open position where the third aperture is partially open; wherein: the heating, ventilation and air conditioning unit defines a fresh air mode when the first door is in the open position, the second door is in the open position, and the third door is in the closed position; the heating ventilation and air conditioning unit defines a partial-recirculation air mode when the first door is in the open position, the second door is in the closed position, and the third door is in the partially-open position; the heating, ventilation and air conditioning unit defines a recirculation air mode when the first door is in the closed position, the second door is in the closed position, and the third door is in the open position.

Preferably, the heating, ventilation and air conditioning unit is configured so that in the fresh air mode, the exterior airflow is allowed to enter the case through the second aperture and directly impinge on the third door, while being prevented from leaving the case through the third aperture.

Preferably, the heating, ventilation and air conditioning unit is arranged so that in the open position of the second door, the exterior airflow is able to travel along a first straight line extending from the first aperture to the third door.

Preferably, the case includes a common aperture upstream of the first aperture and the second aperture, configured to supply the exterior airflow to the first aperture and the second aperture.

Preferably, the case includes a common aperture upstream of the first aperture and the second aperture, configured to supply the exterior airflow to the first aperture and the second aperture, wherein the common aperture, the second aperture and the third aperture are arranged along a first straight line, wherein the first straight line pierces through the common aperture, the second aperture and the third aperture.

Preferably, the heating, ventilation and air conditioning unit is configured so that the exterior airflow is prevented from leaving the case through the third aperture after entering through the first aperture.

Preferably, the first door is configured to obstruct a flow of the exterior airflow towards the third aperture in any position of the first door.

Preferably, the heating, ventilation and air conditioning unit is arranged so that in the open positions of the first door and the third door the exterior airflow is unable to travel along a second straight line extending from the first aperture to the third aperture.

Preferably, the heating, ventilation and air conditioning unit includes the first aperture and the second aperture being arranged in parallel to each other.

Preferably, the heating, ventilation and air conditioning unit is configured to supply the exterior airflow substantially perpendicularly to the first aperture and the second aperture.

Preferably, the first door is of a butterfly type.

Preferably, the second door is of a butterfly type.

Preferably, the third door is of a butterfly type.

Preferably, the case includes a divider between the first aperture and the second aperture, protruding upstream and being configured to divide the exterior airflow into a first exterior airstream to flow through the first aperture and a second exterior airstream to flow through the second aperture.

Preferably, the case includes a fourth aperture defined by an edge and being arranged to evacuate air, e.g., towards the blower.

Preferably, the fourth aperture includes a first guide for separating the evacuated airflow into a first evacuated airstream and a second evacuated airstream.

Preferably, the first guide is a walled element with varying thickness, including a first section and a second section, with the second section having a generally smaller thickness than the first thickness.

Preferably, the case includes a divider between the first aperture and the second aperture, protruding upstream and being configured to divide the exterior airflow into a first exterior airstream to flow through the first aperture and a second exterior airstream to flow through the second aperture, wherein the first door in the open position cooperates with the divider and the first guide so that the first evacuated airstream is the first exterior airstream from the first aperture.

Preferably, the fourth aperture includes a second guide arranged in-between the edge of the fourth aperture and the first guide, from a side of the first guide facing the first aperture, the second guide being configured to divide the first evacuated airstream into two parts.

Preferably, the fourth aperture includes a third guide arranged in-between the edge of the fourth aperture and the first guide, from a side of the first guide facing the third aperture, the third guide being configured to divide the second evacuated airstream into two parts.

BRIEF DESCRIPTION OF DRAWINGS

The present invention will be described in greater detail below with reference to the drawings. In the drawings.

DETAILED DESCRIPTION OF THE INVENTION

Figure 1:
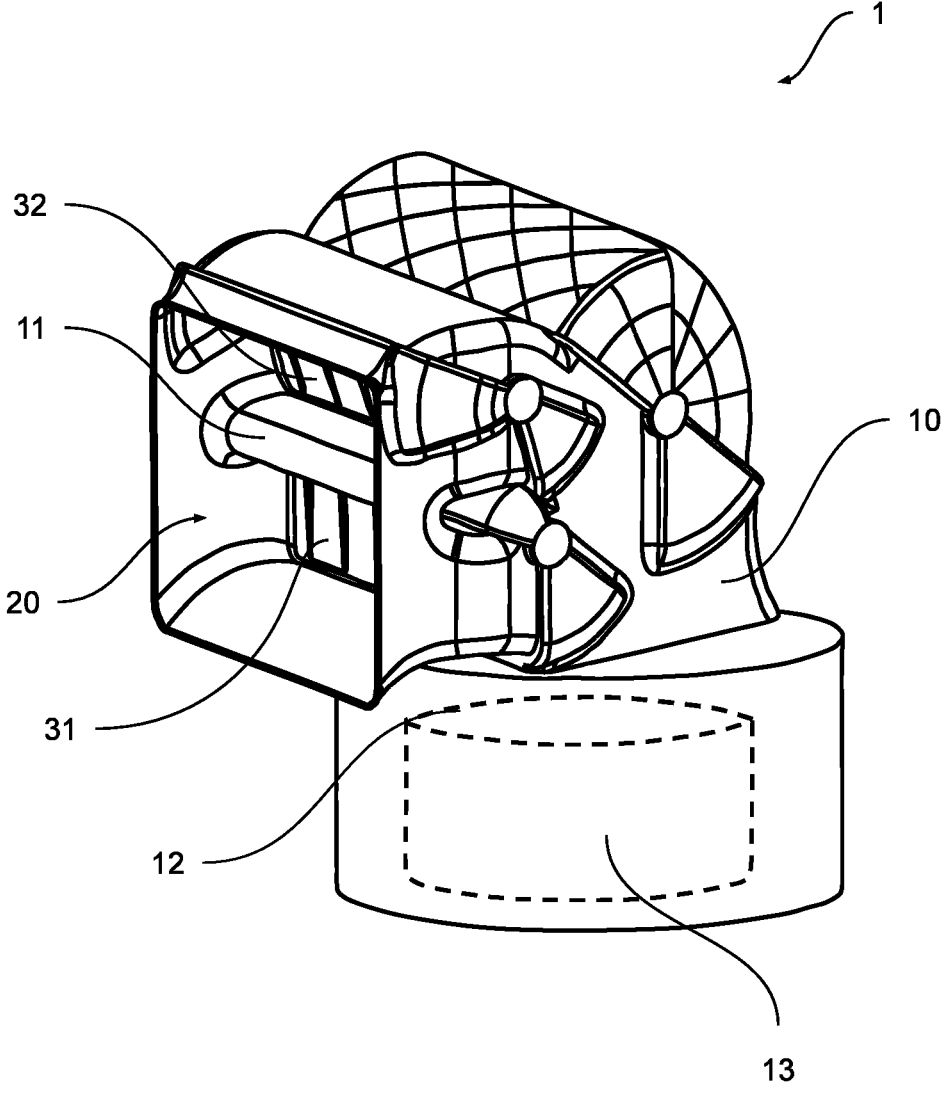
FIG. 1 shows schematically an HVAC unit according to the invention in a perspective view from above.

The present invention relates to a Heating, Ventilation, Air-conditioning (HVAC) unit for a vehicle, hereinafter referred to as HVAC unit 1, which is shown schematically in FIGS. 1 and 2 in a perspective view respectively from above and from below.

The HVAC unit 1 is provided for the recirculation air management (RAM). The HVAC unit 1 can operate in three modes, such as a fresh air mode, a recirculation air mode, and a partial-recirculation air mode. The partial-recirculation air mode is provided in the HVAC unit 1 in order to avoid frosting of windshields and door windows.

Usually, in the prior art solutions, when apertures for introducing a fresh air and a recirculation air are in open positions during the partial-recirculation air mode, there is a possibility that the fresh air from the fresh air apertures can directly flow into the recirculation air aperture due to the pressure difference between the fresh air and recirculation air. To avoid such scenario, the present invention proposes a first aperture 21 and a second aperture 22 for fresh air configured as it is described below.

The fresh air is hereinafter referenced to as an exterior airflow A1, while the recirculation air is referenced to as an interior airflow A2.

In one embodiment, the exterior airflow A1 is an ambient air from atmosphere and the interior airflow A2 is air from a passenger's cabin of a vehicle.

The HVAC unit 1 includes a case 10 adapted to accommodate various elements. In one embodiment, the HVAC unit 1 includes the case 10, the first aperture 21 with a first door 31, the second aperture 22 with a second door 32 and a third aperture 23 with a third door 33.

The first aperture 21 and the second aperture 22 are arranged to receive the exterior airflow A1. The first aperture 21 and the second aperture 22 are communicated, e.g. by a duct, with exterior of the vehicle. The duct can be arranged at the front of the vehicle, and receive air as the vehicle is moving.

The third aperture 23 is arranged to receive the interior airflow A2. The third aperture 23 can be communicated, e.g. by a duct, with the passenger's cabin of the vehicle.

The first door 31 is rotatably attached to the case 10. The first door 31 is movable between an open position where the first aperture 21 is open and a closed position where the first aperture 21 is closed. Although the first door 31 moves between the first position and the second position to respectively open and close the first aperture 21, it is possible to position the first door 31 in between the first position and the second position to partially close the first aperture 21.

The second door 32, separate from the first door 31, is rotatably attached to the case 10. The second door 32 is movable between an open position where the second aperture 22 is open and a closed position where the second aperture 22 is closed. Although the second door 32 moves between the first position and the second position to respectively open and close the second aperture 22, it is possible to position the first door 31 in between the first position and the second position to partially close the first aperture 21.

The third door 33 is rotatably attached to the case 10. The third door 33 is movable between an open position where the third aperture 23 is open, a closed position where the third aperture 23 is closed, and a partially-open position where the third aperture 23 is partially open. Although the third door 33 moves between the first position and the second position to respectively open and close the third aperture 23, it is possible to position the third door 33 in between the first position and the second position to partially close the third aperture 23.

The HVAC unit 1 further includes a blower 13 provided downstream to the first aperture 21, the second aperture 22 and the third aperture 23. The case 10 can include a fourth aperture 40 defined by an edge 44 and being arranged to evacuate all the air from the case, e.g. towards the blower 13. The filter (not shown) can be provided downstream the blower 13 to filter the airflow received therefrom. The blower 13 is adapted to draw air, e.g. mixed air, from the first, second and/or third apertures 21, 22, 23 and provides air to other downstream elements such as an evaporator or a heating element (not shown) depending on requirement of the passenger.

The case 10 can include a divider 11 between the first aperture 21 and the second aperture 22, protruding upstream and configured to divide the exterior airflow A1 into a first exterior airstream A1.1 to flow through the first aperture 21 and a second exterior airstream A1.2 to flow through the second aperture 22. The shape of the divider 11 can be adapted to control the parameters of the airstreams A1.1, A1.2.

The HVAC unit 1 can operate in three different modes, such as a fresh air mode, a recirculation air mode, and a partial-recirculation air mode. To avoid any frosting on the windshields and window glass forming due to humidity of the recirculation air, a partial-recirculation air mode is introduced in the HVAC unit 1. In the partial-recirculation air mode, the first aperture 21 and the third aperture 23 are at least partially open to optimally mix the exterior airflow A1 and the interior airflow A2, so that frosting of the windows and windshields can be avoided and the energy consumption of the HVAC unit 1 is reduced. The second door 32 is closed in re-circulation mode.

The first door 31, the second door 32 and the third door 33 can operate based on temperature of ambient air and humidity level inside the vehicle. The HVAC unit 1 can include a humidity sensor or any other means provided in the passenger's cabin to measure the humidity level of the cabin and provide a signal to an ECU (Electronic Control Unit). Further, a temperature sensor can be provided on the outer side of the vehicle and exposed to the ambient air to measure temperature of the ambient air and provide a signal to the ECU. The ECU can control the first door 31, the second door 32, and the third door 33 based on the signals from the temperature sensor and humidity sensor. Different modes of operation of the HVAC unit 1 are explained with forthcoming figures.

Figure 2:
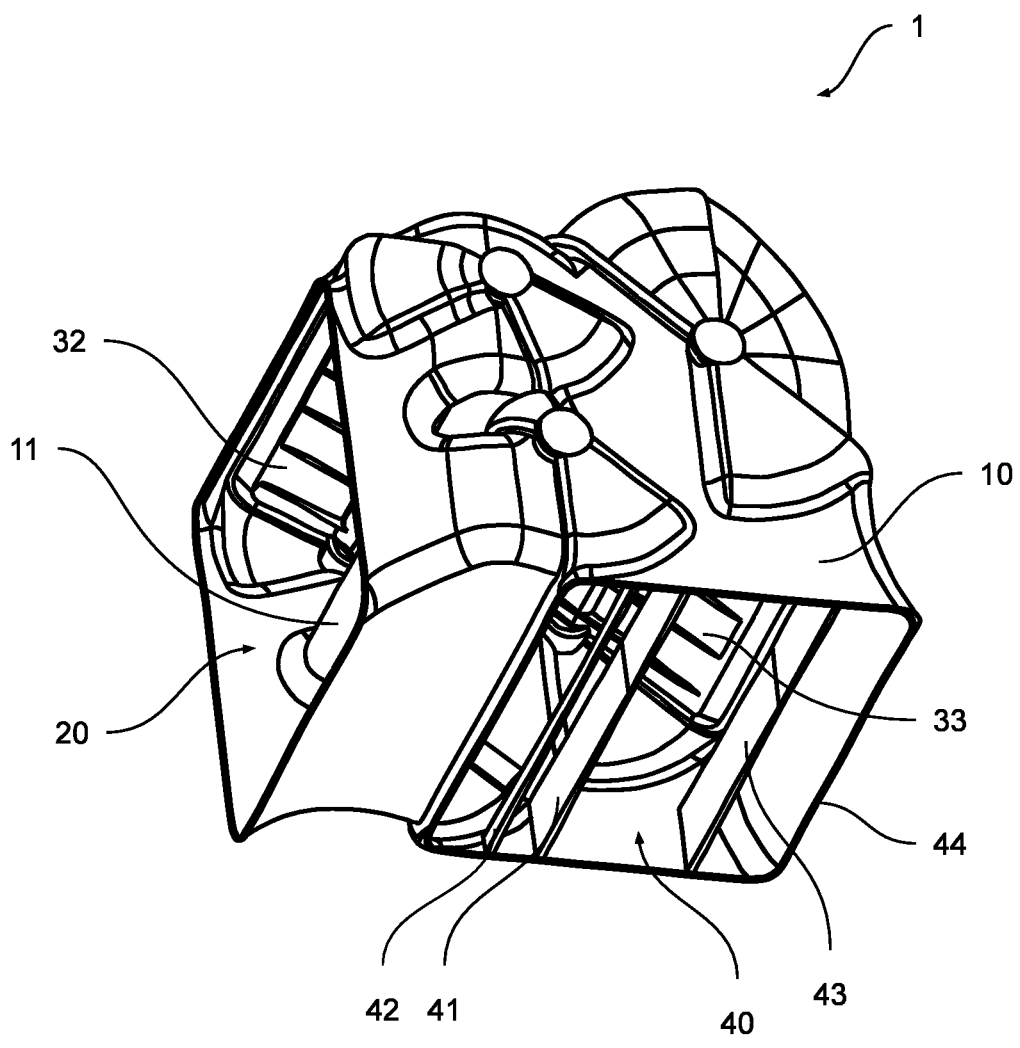
FIG. 2 shows schematically an HVAC unit according to the invention in a perspective view from below.
Figure 3:
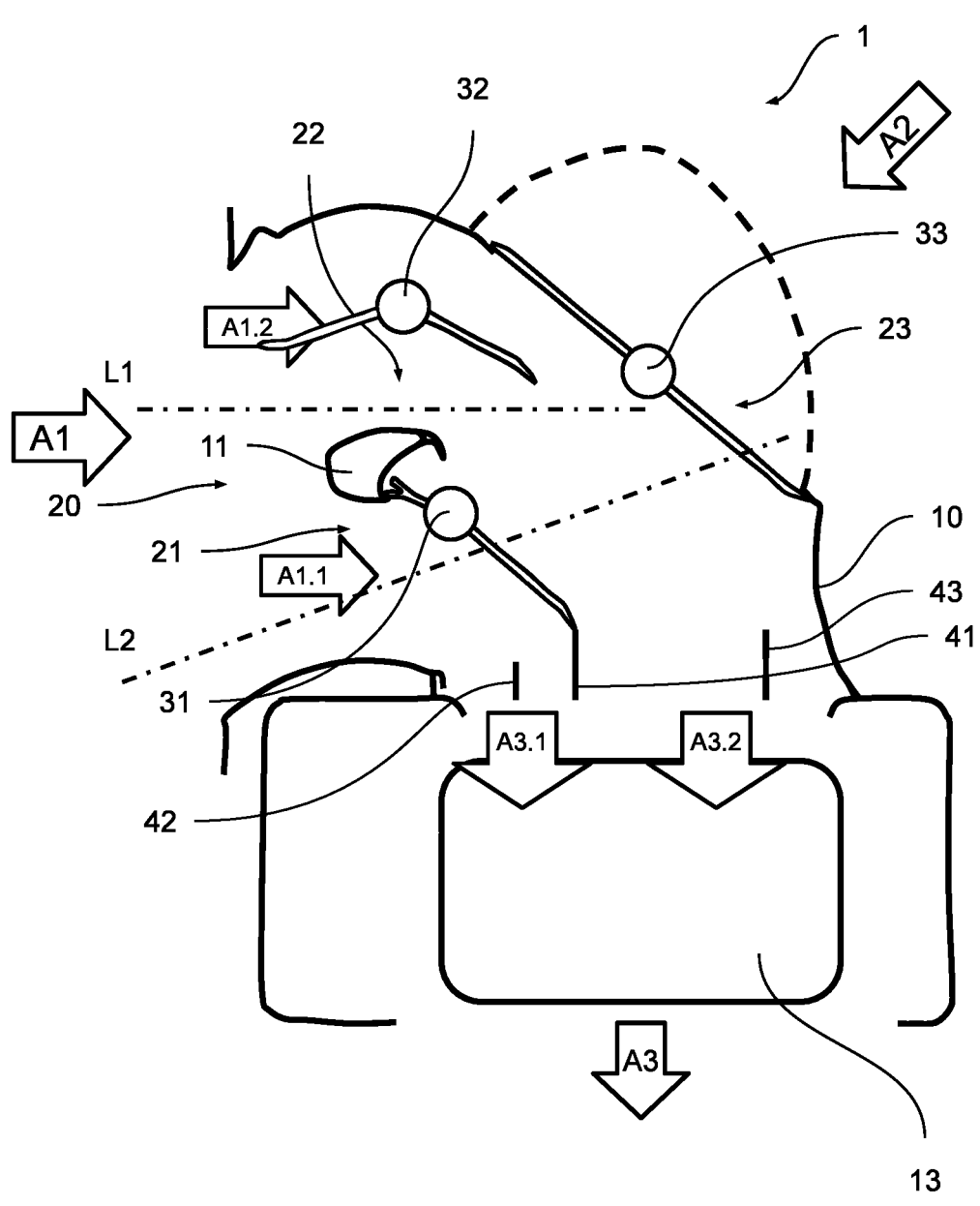
FIG. 3 shows schematically a cross-section of the HVAC unit of FIG. 1 in a fresh air mode.

FIG. 3 illustrates a schematic view of the HVAC unit 1 of FIG. 1 when the HVAC unit 1 is operating in the fresh air mode.

The case 10 can include a common aperture 20 upstream of the first aperture 21 and the second aperture 22, configured to supply the exterior airflow A1 to the first aperture 21 and the second aperture 22.

The first aperture 21 and the second aperture 22 can be arranged in parallel to each other. In other words, general planes of the first aperture 21 and the second aperture 22 can be arranged within a common, larger plane.

The case 10 can be configured to supply the exterior airflow A1 substantially perpendicularly to the first aperture 21 and the second aperture 22. In particular, the exterior air A1, e.g. form a supply duct, can be arriving from the common aperture 20 is a generally perpendicular direction with respect to the general planes of the first aperture 21 and the second aperture 22.

The common aperture 20, the second aperture 22 and the third aperture 23 can be arranged along a first straight line L1, wherein the first straight line L1 pierces through the common aperture 20, the second aperture 22 and the third aperture 23. In other words, in the theoretical absence of any doors and other elements along the first straight line L1, the first exterior airstream A1.1 could travel along the first straight line L1 from the common aperture 20, through the second aperture 22 to and through the third aperture 23.

Preferably, the exterior airflow A1 is prevented from leaving the case 10 through the third aperture 23 after entering through the first aperture 21, in particular during operation of the blower 13. For example, the case 10 can be configured to offset the general direction and inertia of the exterior air A1 coming through the first aperture 21 through negative pressure created by the blower 13 and appropriate placement, shape and control of the first door 31, as well as of the third door 33 at the third aperture 23. For example, the first door 31 can be configured to obstruct a flow of the exterior airflow A1 towards the third aperture 23 in any position of the first door 31. For example, the divider 11 can be shaped to cooperate with the shape of the first door 31 (e.g. in the closed, open position and/or partially open positions) and of the shape of the case 10 to effectively block the first exterior airstream A1.1 from reaching the third aperture 23, even if the third door 33 is in its open position, when the blower 13 is operating and drawing air.

In the fresh air mode, the first aperture 21 and the second aperture 22 are opened by moving the first door 31 and the second door 32, respectively, into their open positions. Consequently, the exterior airflow A1, for example ambient air, is provided to the case 10. Meanwhile, the third aperture 23 is in a closed position, by moving the third door 33 into its closed position, so that the interior airflow A2 is blocked from entering the case 10 through the third aperture 23. The exterior airflow A1 is enabled to flow from the first aperture 21 and the second aperture 22 to the blower 13. Even though the second aperture 22 is arranged directly on the path of the second exterior airstream A1.2 towards the third aperture 23, the second exterior airstream A1.2 is prevented from entering the third aperture 23, and consequently the passenger's cabin, because the third door 33 is closed. The second airstream A1.2 is deflected by the third door 33 towards the blower 13. Similarly, the first exterior airstream A1.1 is prevented from entering the third aperture 23, and consequently the passenger's cabin, because the third door 33 is closed. The first airstream A1.1 is deflected by the first door 31 towards the blower 13.

In other words, in the fresh air mode, the exterior airflow A1 is allowed to enter the case 10 through the second aperture 22 and directly impinge on the third door 33, while being prevented from leaving the case 10 through the third aperture 23. In the open position of the second door 32, the exterior airflow A1 is able to travel along a first straight line L1 extending from the first aperture 21 to the third door 33.

Preferably, the first door 31 is of a butterfly type. Preferably, the second door 32 is of a butterfly type. Preferably, the third door 33 is of a butterfly type. Using butterfly type doors enables reduction of torque imparted thereto by the respective airstream.

Figure 4:
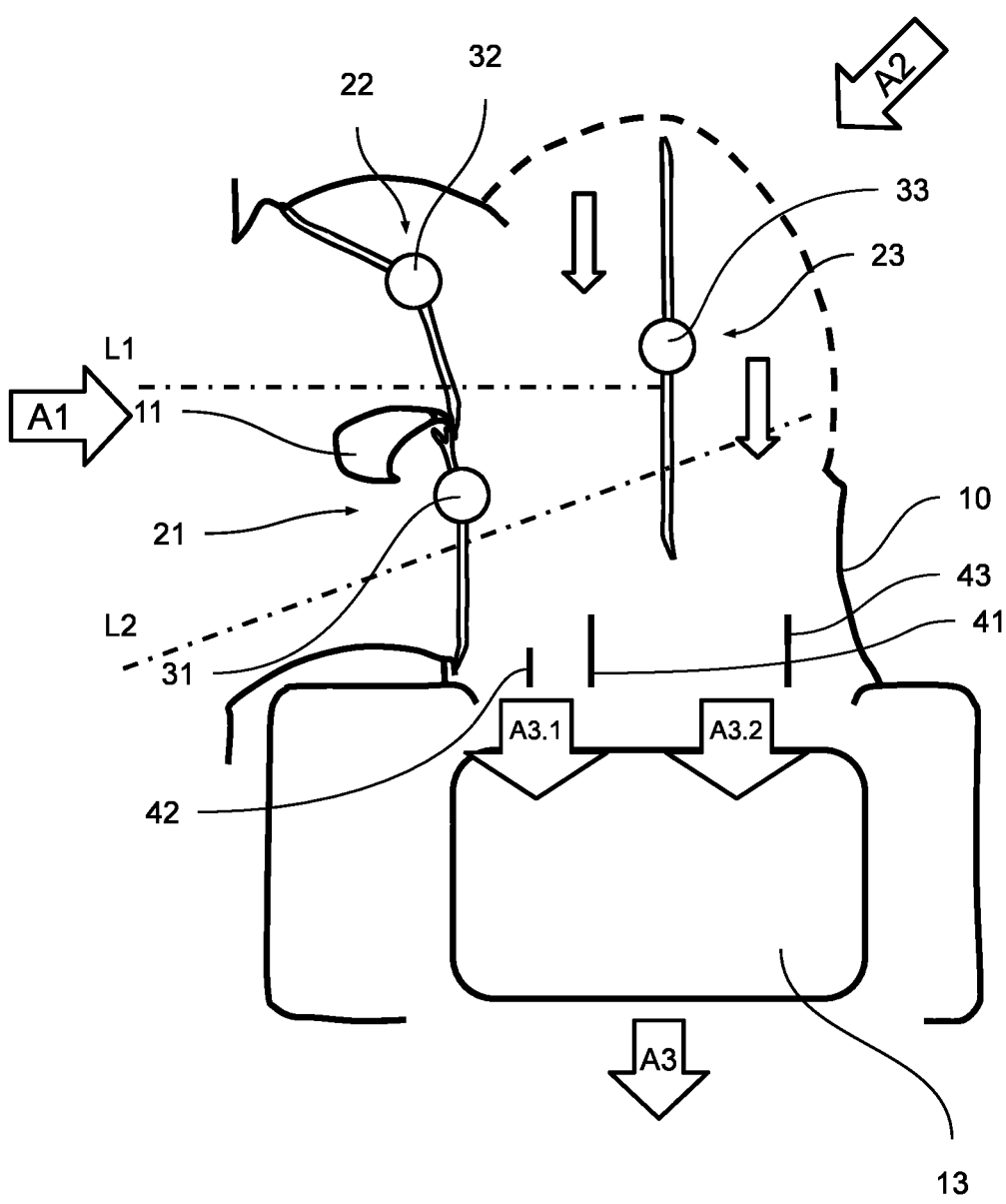
FIG. 4 shows schematically a cross-section of the HVAC unit of FIG. 1 in a recirculation air mode.

FIG. 4 illustrates a schematic view of the HVAC unit 1 of FIG. 1 when the HVAC unit 1 is operating in the recirculation air mode. In the recirculation air mode, the first aperture 21 and the second aperture 22 are closed, while the third aperture 23 is open, so that the interior airflow A2, i.e., recirculated air from the passenger's cabin, is provided back to the case 10. To achieve this, the first door 31 and the second door 32 are moved into closed positions, and the third door 33 is moved to the open position, thereby defining the recirculation air mode. The exterior air A1 is prevented from entering the case 10.

Figure 5:
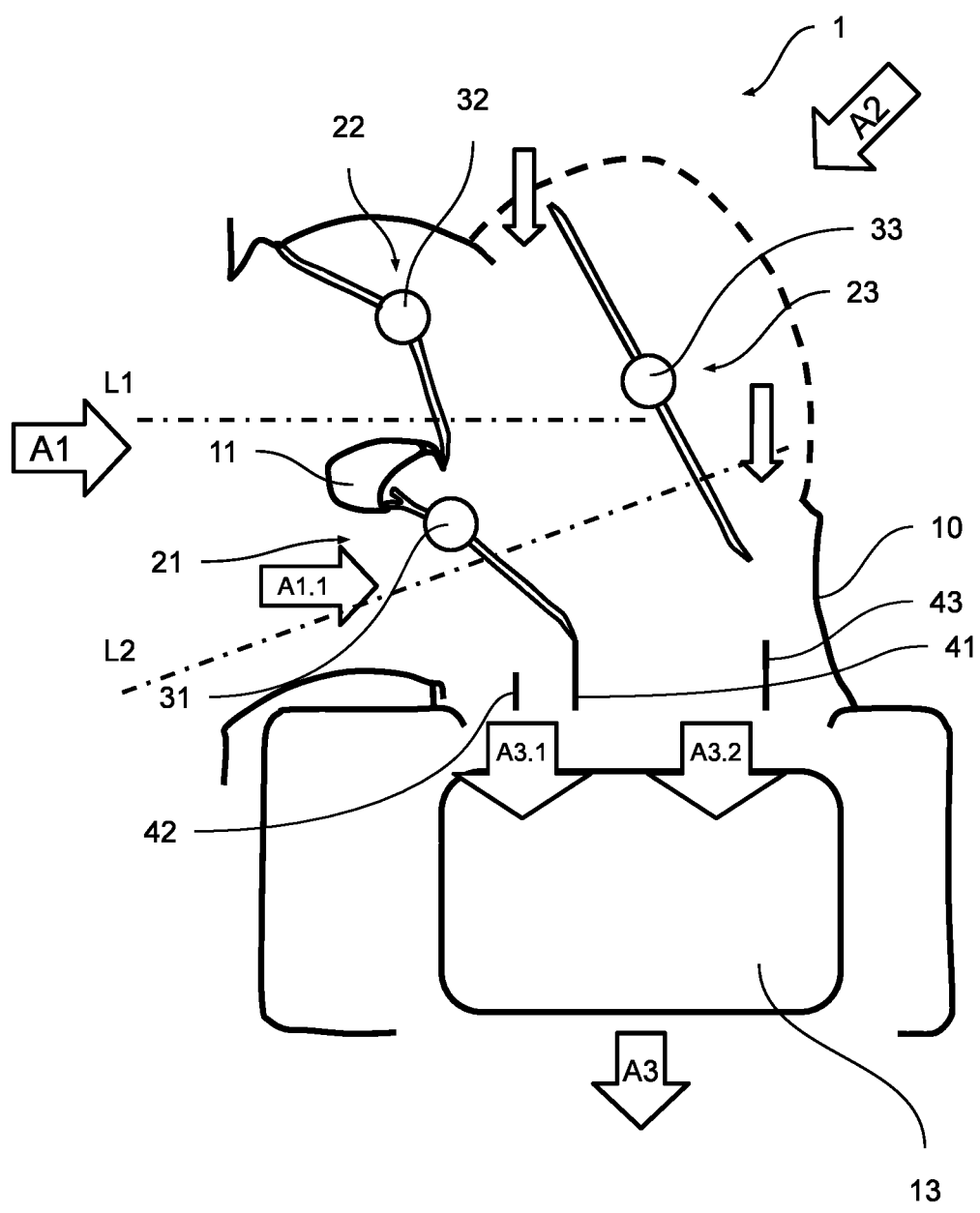
FIG. 5 shows schematically a cross-section of the HVAC unit of FIG. 1 in a partial-recirculation air mode.

FIG. 5 illustrates schematic view of the HVAC unit 1 of FIG. 1 when the HVAC unit 1 is operating in the partial-recirculation air mode. In the partial-recirculation air mode, the exterior airflow A1 and the interior airflow A2 are mixed to avoid any frosting on the glass windows and windshields. As the fresh air is mixed with a partial recirculated air, the humidity level of the air entering into the case 10 is controlled, thereby avoiding the above-mentioned problem. To achieve this, the first door 31 is moved to the open position and the second door 32 is moved to the closed position. Further, the third door 33 is in open position, where the recirculated air/interior airflow A2 is entering into the case 10. Preferably, the third door 33 is moved into a partially-open position to maintain the overall air volume drawn in by the blower 13. The exterior airflow A1 and the interior airflow A2 can be at a different pressure level. In this example, the exterior airflow A1 is having a higher pressure and velocity than the interior airflow A2, so normally there would be a possibility of the exterior airflow A1 moving to and through the third aperture 23. To avoid such scenario, the second door 32 moved to the closed position, so the high-pressure exterior airflow A1 is forced to flow through the first aperture 21. From there, the air can be guided towards the blower 13. Even though the second aperture 22 is arranged directly on the path of the second exterior airstream A1.2 towards the third aperture 23, the second exterior airstream A1.2 is prevented from entering the third aperture 23, and consequently the passenger's cabin, because the second door 32 is closed.

Preferably, in the open positions of the first door 31 and the third door 33 the exterior airflow A1 is unable to travel along a second straight line L2 extending from the first aperture 21 to the third aperture 23.

Figure 6:
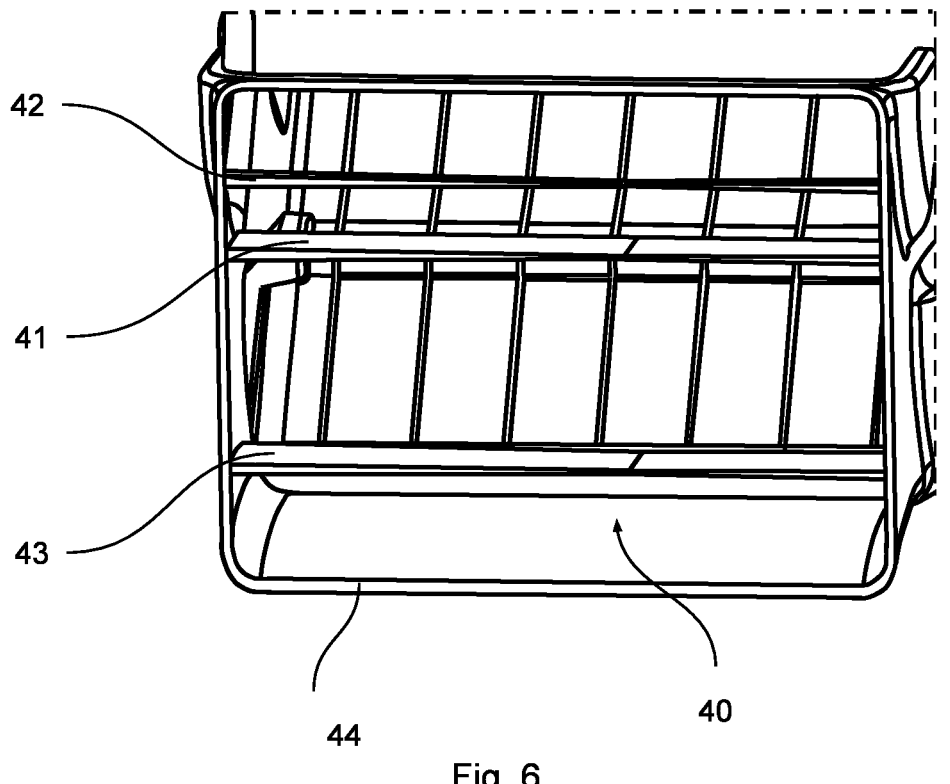
FIG. 6 shows a partial perspective view of the HVAC unit of FIGS. 1 and 2 from below.

FIG. 6 shows a partial perspective view of the HVAC unit 1 of FIGS. 1 and 2 from below.

The fourth aperture 40 can include a first guide 41 for separating the evacuated airflow into a first evacuated airstream A3.1 and a second evacuated airstream A3.2. The first guide 41 can be a wall element.

The first door 31 can cooperate, in the open position, with the divider 11 and the first guide 41 so that the first evacuated airstream A3.1 is the first exterior airstream A1.1 from the first aperture 21. In other words, the shapes of these elements are adjusted to create a substantially sealed path for the first exterior airstream A1.1 to be evacuated in the form of the first evacuated airstream A3.1 in the open position of the first door 31.

The fourth aperture 40 can include a second guide 42 arranged in-between the edge of the fourth aperture 40 and the first guide 41, from a side of the first guide 41 facing the first aperture 21, the second guide 42 being configured to divide the first evacuated airstream A3.1 into two parts. The second guide 42 can be a wall element. The dimensions of the second guide 42 can be adjusted to match the position of the first door 31 in its partially open position and still be able to create a substantially sealed path for the first exterior airstream A1.1 to be evacuated in the form of the first evacuated airstream A3.1 in the partially open position of the first door 31.

The fourth aperture 40 can include a third guide 43 arranged in-between the edge of the fourth aperture 40 and the first guide 41, from a side of the first guide 41 facing the third aperture 23, the third guide 43 being configured to divide the second evacuated airstream A3.2 into two parts. The third guide 43 can be a wall element.

In general, the invention improves pressure restriction in the inlet due to the doors allowing streamlining the airstream. More space can be given for kinematics controlling the doors 31, 32, 33. Utilization of the first door 31 and the second door 32 enables improved and more detailed control of the incoming exterior airflow A1 compared to a single-door solution. Also, the distance path between the first, second and third apertures 31, 32, 33 and the fourth aperture 40 (so effectively a blower inlet) can be reduced, thereby enabling a more compact design.

The invention claimed is:

1. A heating, ventilation and air conditioning unit comprising:
    a case defining a first aperture, a second aperture and a third aperture,
    the first aperture and the second aperture being arranged to receive an exterior airflow, and the third aperture being arranged to receive an interior airflow;
    a first door rotatably attached to the case, the first door being movable between an open position where the first aperture is open and a closed position where the first aperture is closed;
    a second door, separate from the first door, rotatably attached to the case, the second door being movable between an open position where the second aperture is open and a closed position where the second aperture is closed; and
    a third door rotatably attached to the case, the third door being movable between an open position where the third aperture is open, a closed position where the third aperture is closed, and a partially-open position where the third aperture is partially open;
    wherein:
    the heating, ventilation and air conditioning unit defines a partial-recirculation air mode when the first door is in the open position, the second door is in the closed position, and the third door is in the partially-open position;
    the heating, ventilation and air conditioning unit defines a recirculation air mode when the first door is in the closed position, the second door is in the closed position, and the third door is in the open position and
    wherein in the open position of the first door and the partially-open position of the third door, the exterior airflow is unable to travel along a first straight line extending from the first aperture to the third aperture.

2. The heating, ventilation and air conditioning unit according to claim 1, configured so that in the fresh air mode, the exterior airflow is allowed to enter the case through the second aperture and directly impinge on the third door, while being prevented from leaving the case through the third aperture.

3. The heating, ventilation and air conditioning unit according to claim 1, arranged so that in the open position of the second door, the exterior airflow is able to travel along a first straight line extending from the first aperture to the third door.

4. The heating, ventilation and air conditioning unit according to claim 1, wherein the case includes a common aperture upstream of the first aperture and the second aperture, configured to supply the exterior airflow to the first aperture and the second aperture.

5. The heating, ventilation and air conditioning unit according to claim 1, wherein the case includes a common aperture upstream of the first aperture and the second aperture, configured to supply the exterior airflow to the first aperture and the second aperture, wherein the common aperture, the second aperture and the third aperture are arranged along a second straight line, wherein the second straight line pierces through the common aperture, the second aperture and the third aperture.

6. The heating, ventilation and air conditioning unit according to claim 1, configured so that the exterior airflow is prevented from leaving the case through the third aperture after entering through the first aperture.

7. The heating, ventilation and air conditioning unit according to claim 1, wherein the first door is configured to obstruct a flow of the exterior airflow towards the third aperture in any position of the first door.

8. The heating, ventilation and air conditioning unit according to claim 1, with the first aperture and the second aperture being arranged in parallel to each other.

9. The heating, ventilation and air conditioning unit according to claim 1, configured to supply the exterior airflow substantially perpendicularly to the first aperture and the second aperture.

10. The heating, ventilation and air conditioning unit according to claim 1, wherein the first door is of a butterfly type.

11. The heating, ventilation and air conditioning unit according to claim 1, wherein the second door is of a butterfly type.

12. The heating, ventilation and air conditioning unit according to claim 1, wherein the third door is of a butterfly type.

13. The heating, ventilation and air conditioning unit according to claim 1, wherein the case includes a divider between the first aperture and the second aperture, protruding upstream and being configured to divide the exterior airflow into a first exterior airstream to flow through the first aperture and a second exterior airstream to flow through the second aperture.

14. The heating, ventilation and air conditioning unit according to claim 1, wherein the case includes a fourth aperture defined by an edge and being arranged to evacuate air from the case.

15. The heating, ventilation and air conditioning unit according to claim 14, wherein the fourth aperture includes a first guide for separating the evacuated airflow into a first evacuated airstream and a second evacuated airstream.

16. The heating, ventilation and air conditioning unit according to claim 15, wherein the case includes a divider between the first aperture and the second aperture, protruding upstream and being configured to divide the exterior airflow into a first exterior airstream to flow through the first aperture and a second exterior airstream to flow through the second aperture, wherein the first door in the open position cooperates with the divider and the first guide so that the first evacuated airstream is the first exterior airstream from the first aperture.

17. The heating, ventilation and air conditioning unit according to claim 15, wherein the fourth aperture includes a second guide arranged in-between the edge of the fourth aperture and the first guide, from a side of the first guide facing the first aperture, the second guide being configured to divide the first evacuated airstream into two parts.

18. The heating, ventilation and air conditioning unit according to claim 17, wherein the fourth aperture includes a third guide arranged in-between the edge of the fourth aperture and the first guide, from a side of the first guide facing the third aperture, the third guide being configured to divide the second evacuated airstream into two parts.

19. A heating, ventilation and air conditioning unit comprising:

a case defining a first aperture, a second aperture, a third aperture and a common aperture, the first aperture and the second aperture being arranged to receive an exterior airflow, and the third aperture being arranged to receive an interior airflow;

the common aperture upstream of the first aperture and the second aperture, configured to supply the exterior airflow to the first aperture and the second aperture, wherein the common aperture, the second aperture and the third aperture are arranged along a first straight line through an interior of the case, a first door rotatably attached to the case, the first door being movable between an open position where the first aperture is open and a closed position where the first aperture is closed;

a second door, separate from the first door, rotatably attached to the case, the second door being movable between an open position where the second aperture is open and a closed position where the second aperture is closed; and a third door rotatably attached to the case, the third door being movable between an open position where the third aperture is open, a closed position where the third aperture is closed, and a partially-open position where the third aperture is partially open.

20. The heating, ventilation and air conditioning unit according to claim 19, wherein the heating, ventilation and air conditioning unit defines a partial-recirculation air mode when the first door is in the open position, the second door is in the closed position, and the third door is in the partially-open position; and the heating, ventilation and air conditioning unit defines a recirculation air mode when the first door is in the closed position, the second door is in the closed position, and the third door is in the open position.

* * * * *